US009486872B2

(12) United States Patent
Keong et al.

(10) Patent No.: US 9,486,872 B2
(45) Date of Patent: Nov. 8, 2016

(54) MANUFACTURING METHOD FOR ADVANCED HIGH-STRENGTH STEEL WHEEL AND JIG DEVICE THEREOF

(71) Applicant: METAL INDUSTRIES RESEARCH & DEVELOPMENT CENTRE, Kaohsiung (TW)

(72) Inventors: Chi-Wah Keong, Kaohsiung (TW); Chih-Lun Lin, Kaohsiung (TW); Chia-Min Wei, Kaohsiung (TW); Chun-Chieh Wang, Kaohsiung (TW); Lung-Tien Wu, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 198 days.

(21) Appl. No.: 14/017,104

(22) Filed: Sep. 3, 2013

(65) Prior Publication Data
US 2014/0183166 A1 Jul. 3, 2014

(30) Foreign Application Priority Data

Dec. 27, 2012 (TW) .............................. 101150708 A

(51) Int. Cl.
*B23K 9/00* (2006.01)
*B23K 9/028* (2006.01)
(Continued)

(52) U.S. Cl.
CPC ............ *B23K 9/0026* (2013.01); *B23K 9/028* (2013.01); *B23K 9/23* (2013.01); *B60B 3/02* (2013.01); *B60B 2310/224* (2013.01); *B60B 2310/302* (2013.01); *B60B 2360/102* (2013.01); *B60B 2900/113* (2013.01)

(58) Field of Classification Search
None
See application file for complete search history.

(56) References Cited

U.S. PATENT DOCUMENTS

| 1,958,974 A | * | 5/1934 | Nelson | ....................... B60B 3/18 |
| | | | | 29/894.341 |
| 2,685,629 A | | 8/1954 | Peck | |
| 3,934,324 A | * | 1/1976 | Hess | ....................... B21D 53/30 |
| | | | | 228/125 |

(Continued)

FOREIGN PATENT DOCUMENTS

CN   1202858 A   12/1998
CN   202302326 U   7/2012
(Continued)

OTHER PUBLICATIONS

Li, et al.; "Lightweighting of Car Body and Its Challenges to Joining Technologies"; Journal of Mechanical Engineering; vol. 45, No. 18, Sep. 2012, pp. 44-54.

Primary Examiner — Jacob Cigna
(74) Attorney, Agent, or Firm — Rosenberg, Klein & Lee

(57) ABSTRACT

The present invention relates to a manufacturing method for advanced high-strength steel (AHSS) wheel, comprising the following steps. Take an AHSS with at least 590 MPa of tensile strength for rolling to circular ring of a rim. Apply low heat input welding, such as the cold metal transfer (CMT) welding or the gas tungsten arc welding/tungsten inert gas arc welding (GTAW/TIG), at the junction of the rim to form a hollow cylindrical rim. Then perform hole expanding and spinning/roll forming operations to the rim. Take another AHSS with at least 980 MPa of tensile strength for pressing and forming a disk. Apply low heat input welding, such as cold metal transfer (CMT) welding, to the rim and the disk to produce a wheel. According to the present invention, the welding quality of products can be improved significantly; the fatigue lifetime of wheels can be enhanced; and wheels are lightweight.

12 Claims, 10 Drawing Sheets

(51) Int. Cl.
  *B23K 9/23* (2006.01)
  *B60B 3/02* (2006.01)

(56) References Cited

U.S. PATENT DOCUMENTS

| | | | | |
|---|---|---|---|---|
| 4,082,935 A * | 4/1978 | Lampietti | ............... | B21D 53/30 219/101 |
| 4,634,038 A * | 1/1987 | Luigi | ..................... | B21D 53/30 228/149 |
| 5,029,385 A * | 7/1991 | Daniels | ................. | B23P 19/027 29/525 |
| 5,579,578 A * | 12/1996 | Ashley, Jr. | ............. | B21D 53/30 29/894.322 |
| 6,114,656 A | 9/2000 | Fairchild | | |
| 6,282,788 B1 * | 9/2001 | Politi | ..................... | B21D 53/26 29/894 |
| 6,357,116 B1 * | 3/2002 | Waelchli | ................. | B21D 53/26 29/252 |
| 8,491,063 B2 * | 7/2013 | Stich | ........................ | 301/63.103 |
| 2002/0134820 A1 * | 9/2002 | Kemmerer | ......... | B23K 37/0443 228/245 |
| 2004/0226634 A1 * | 11/2004 | Hirasawa | ............... | C21D 6/002 148/609 |
| 2006/0284474 A1 * | 12/2006 | Bluemel | ................... | B60B 1/10 301/63.101 |
| 2009/0010793 A1 * | 1/2009 | Becker | ................... | C21D 6/005 420/38 |
| 2011/0227400 A1 * | 9/2011 | Stich | ....................... | B60B 3/044 301/63.101 |
| 2013/0243640 A1 * | 9/2013 | Yamamoto | ............. | C22C 38/02 420/91 |
| 2014/0183166 A1 * | 7/2014 | Keong | ..................... | B60B 3/02 219/74 |

FOREIGN PATENT DOCUMENTS

| | | | |
|---|---|---|---|
| CN | 202541201 U | * | 11/2012 |
| TW | 387832 B | | 4/2000 |
| TW | I313207 B | | 8/2009 |
| TW | M427335 U | | 4/2012 |

* cited by examiner

MANUFACTURING METHOD FOR ADVANCED HIGH-STRENGTH STEEL WHEEL AND JIG DEVICE THEREOF

FIELD OF THE INVENTION

The present invention relates generally to a manufacturing method for wheel, and particularly to a manufacturing method for advanced high-strength steel wheel and the jig device thereof using the welding technology of low heat input.

BACKGROUND OF THE INVENTION

The occurrence of oil crisis makes people to start emphasizing the subjects of energy saving and protection of earth's resources. Automobiles are the major vehicles for transportation. They are also the main source of pollution because of the exhaust and the energy consumption. Thereby, lightweight of car construction has become a significant direction for improvement. By thinning the material, the weight of cars is lowered, and hence reducing the fuel consumption and improving exhaust emission. The materials of current commercial wheels mainly include steel or aluminum alloy; some also include magnesium or titanium alloy. The manufacturing methods include casting, forging, and welding. The related technologies for steel or aluminum-alloy wheels are disclosed in patent publication numbers TW 1313207, TW 1225808, and CN 1291557A. They all form a rim by welding the junction of two edges of a rolled metal sheet (steel sheet) or aluminum sheet using the traditional welding technology. Although the technologies in the above patents achieve the purpose of manufacturing steel or aluminum-alloy wheels, their main emphasis is on reducing the manufacturing costs of wheels, instead of reducing and thinning materials for reducing the weight of automobiles. Accordingly, considering the purposes of lightweight automobile wheels, reducing fuel consumption, and then improving exhaust emission, the above designs are apparently not ideal.

The crux hindering traditional car wheels to be even more lightweight is because steel wheels are usually formed by two-piece, namely, the rim and the disk, welding. The grades of the materials of the rims and the disks adopted by the technology according to the prior art, the breakthrough of the welding technology according to the prior art, and how to match the two have become the critical points. For example, the material used in the steel rims of all terrain vehicles (ATV) is 440 MPa steel grade and the material for the disks is 590 MPa steel grade. Besides, flash welding is adopted for fabricating rims of traditional cars. Flash welding is a fast and high-resistor heat welding method. The formation of rims is complicated and rigorous with five formation welds. When applied to steel grades under 440 MPa, flash welding is decent in the forming application. Nonetheless, as applied to steel grades of higher strength such the steel grades above 590 Mpa, after flash welding, the hardness of the welds and the heat-affected zone is raised abnormally, leading to cracks in the subsequent formation processes of the rims and lowering the yield significantly. For another example, in the tradition metal active gas (MAG) arc welding, which is also known as $CO_2$ welding, due to its characteristics of continuous wire feeding and spatter displacement during welding, the arc is relatively unstable. Consequently, the hardness of the welds or the heat-affected zone is not uniform. Sometimes, soft regions may appear; sometimes, abnormal hardening may occur. Thereby, as applied to the development of wheels with higher strength, cracks usually occur on the formed rim roll. Alternatively, in the radial test after the rims and the disk are assembled and welded to form a wheel, cracks usually occur. Accordingly, the fatigue lifetime is too low to pass the test.

Limited by the welding technology, the material of rim adopted by the leading domestic manufacturer of car wheels currently is as high as 440 MPa steel grade only. The materials of the rims and the disks used by the greatest domestic manufacturer of ATV wheels are still 440 MPa steel grade, unable to be raised to advanced high-strength steel grades. Moreover, wheel manufacturers weld rims and disks to produce wheels. In general, they use the traditional MAG arc welding. Because the MAG welding has greater heat input, the heat-affected zone is broader. Thereby, the strength of the welded parts degrades, and their fatigue lifetime is also shorter. Besides, the spatters are more, which affects the protection effects to some degree; the quality of welds is inferior, and the grinding operations and costs in post processes are increased. Thereby, how to improve the drawbacks in the manufacturing methods of wheels (steel wheels) according to the prior art has become an important direction of development in the industry.

Accordingly, the present invention provides a manufacturing method for advanced high-strength steel wheel and the jig device thereof, which feature external simplicity in construction, convenience in assembly, and convenience in stacking and positioning.

SUMMARY

An objective of the present invention is to provide a manufacturing method for advanced high-strength steel wheel and the jig device thereof. The present invention can apply low heat input welding technology and the provided jig to manufacturing the wheels of ATV four-wheeled motorcycles, utility vehicles (UV), and car wheels (steel wheels) using advanced high-strength steel (AHSS). According to the present invention, the welding quality of products can be improved significantly; the fatigue lifetime of wheels can be enhanced; and wheels are lightweight. Thereby, the problem of welding AHSS using traditional high heat input welding technology can be solved and the traditional materials for wheels can be thus replaced.

Another objective of the present invention is to provide a manufacturing method for advanced high-strength steel wheel and the jig device thereof. The technical combination can be applied to the production of AHHS wheels with tensile strength reaching 590 MPa and 980 MPa. The manufacturing method for wheel comprises rolling, welding, hole expanding, and spinning/roll forming for producing lightweight, high-strength, superior fatigue lifetime, and high quality wheels.

Still another objective of the present invention is to provide a manufacturing method for advanced high-strength steel wheel and the jig device thereof. By adopting AHSS as the material of wheel, the thickness of rim and disk can be reduced for achieving lightweight (lighter by over 30% than 440 MPa steel grade), high-strength, and anti-fatigue purposes. The radial load is identical to or greater than that of a commercial wheel (steel wheel). The fatigue lifetime is twice the lifetime of a commercial wheel (steel wheel). For example, for a 12-inch ATV wheel, the radial load is 500 Kg (compared to 377 Kg of commercial requirement); the fatigue lifetime is 1,000,000 times (compared to 500,000 of commercial requirement). The present invention outperforms the specifications of SAE J328 and CNS9479. As applied to 15-inch steel wheels, the present invention has similar performance.

A further objective of the present invention is to provide a manufacturing method for advanced high-strength steel wheel and the jig device thereof. The provided jig is designed to work with the low heat input welding process. By combining robots and rotary system for performing synchronous welding, the production process can be automated, overcoming the automation problem encountered by the TIG process and improving the production efficiency significantly. Compared with the traditional MAG welding, the steel wheels manufactured according to the present invention have the property of low deformation. By setting appropriate welding parameters, the effect of no spatter and high quality welding can be achieved. In addition, labor costs for subsequent processes can be saved substantially.

A still further objective of the present invention is to provide a manufacturing method for advanced high-strength steel wheel and the jig device thereof. The present invention adopts low heat input welding, whose heat input is lower than traditional MAG welding by approximately 30%. The welds and heat-affected zones are narrower; the welded parts have higher welding strength, elongation rate, and bend tenacity. Thus, the present invention is suitable for AHSS welding. Besides, the problem of low yield rate due to cracks while forming rims after flash welding higher strength steel grades (above 590 MPa) can be solved, making it applicable to the welding of AHSS steel wheels.

For achieving the objectives described above, the present invention provides the following technical method. Take an AHSS with at least 590 MPa of tensile strength for rolling to circular ring of a rim. Apply low heat input welding, such as the cold metal transfer (CMT) welding or the gas tungsten arc welding/tungsten inert gas arc welding (GTAW/TIG), at the junction of the rim to form a hollow cylindrical rim. Then perform hole expanding and spinning/roll forming operations to the rim. Take another AHSS with at least 980 MPa of tensile strength for pressing a disk. Apply low heat input welding to the rim and the disk to produce a wheel.

For achieving the objectives described above, the jig technology according to the present invention comprises a base, a top positioning member, and a bottom positioning member. The base has a pair of positioning posts on both sides. The inner sides of the two positioning posts have grooves opposing to each other. An accommodating space is formed between the two positioning posts. The top positioning member is fixed on the top surface of the positioning posts and has an operating opening. The bottom positioning member is embedded and positioned in the grooves and located below the top positioning member. The accommodating space is used for disposing a rolled rim, which is positioned between the top and bottom positioning members.

For achieving the objectives described above, the jig technology according to the present invention comprises a hoop welding jig, which further comprises two curved hoop members. Each of the hoop members has a curved part and fixing parts at both ends of the curved part. The two curved hoop members are used for hooping tightly the circumference where a rim and a disk join.

DETAILED DESCRIPTION

In order to make the structure and characteristics as well as the effectiveness of the present invention to be further understood and recognized, the detailed description of the present invention is provided as follows along with embodiments and accompanying figures.

The manufacturing method for AHSS wheel according to the present invention is used for manufacturing a wheel using the material of the newly developed AHSS with a lightweight property. According to the initial results, the weight of AHSS wheel is similar to that of an aluminum-alloy wheel; the strength and the fatigue lifetime of AHSS are higher than those of aluminum alloy. Hence, AHSS has better cost-to-performance ratio. The material will play an important role in lightweight applications and has a promising future of development.

Figure 1:
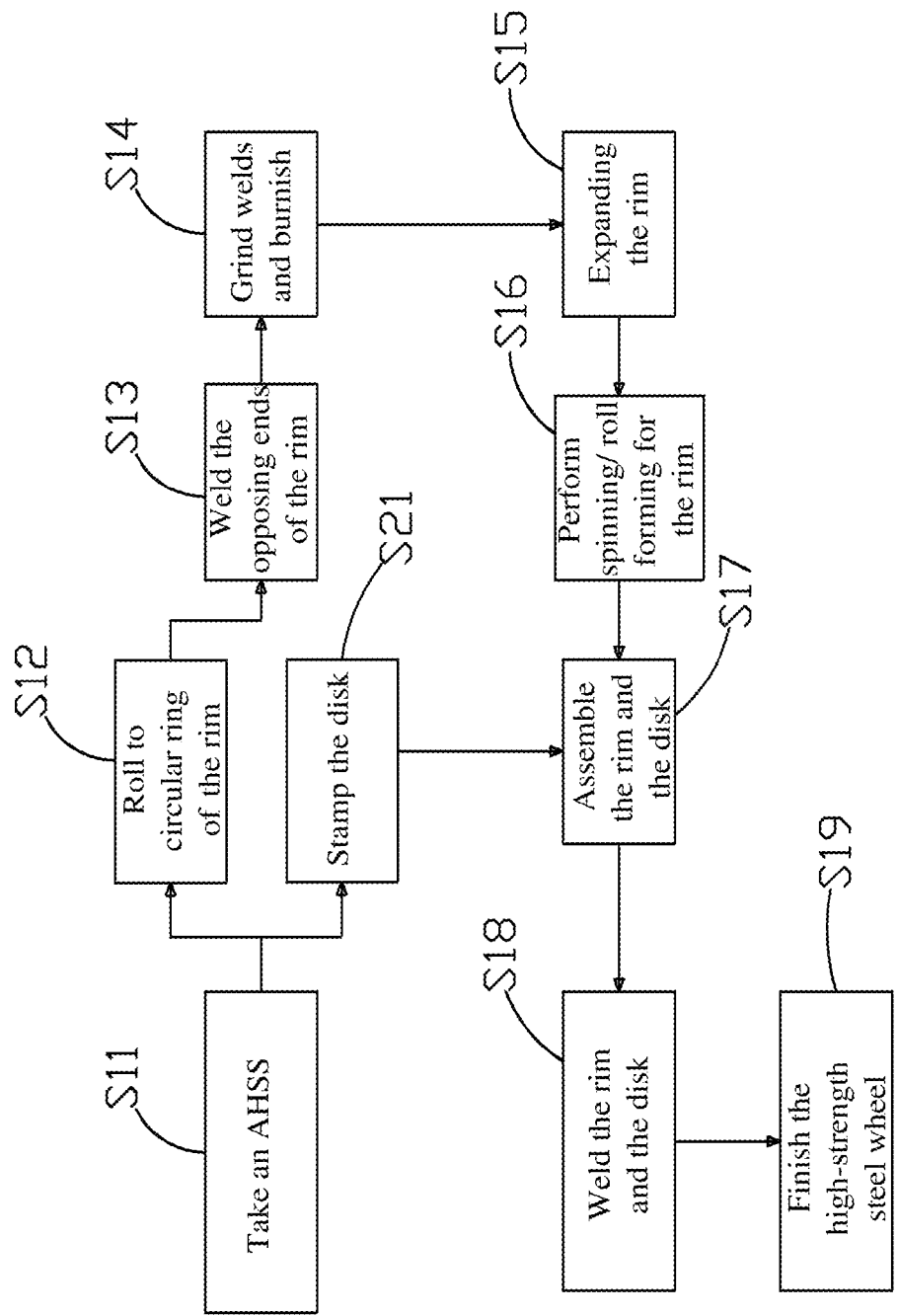
FIG. 1 shows a flowchart of the manufacturing method according to the present invention.

FIG. 1 shows a flowchart of the manufacturing method according to the present invention, which comprises the following steps.

Step S11: Provide an AHSS Material.

Figure 2:
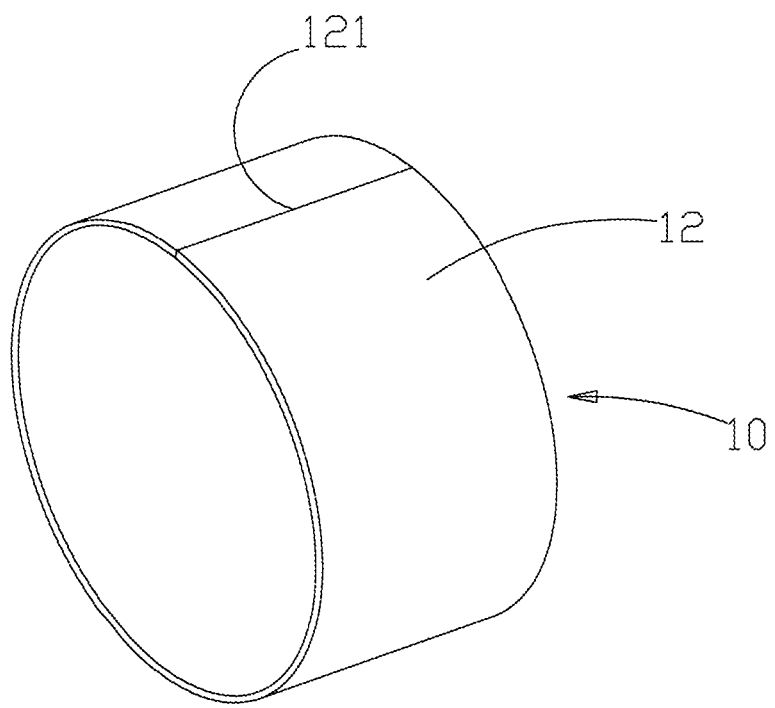
FIG. 2 shows a structural schematic diagram of the rim structure according to the present invention.
Figure 6:
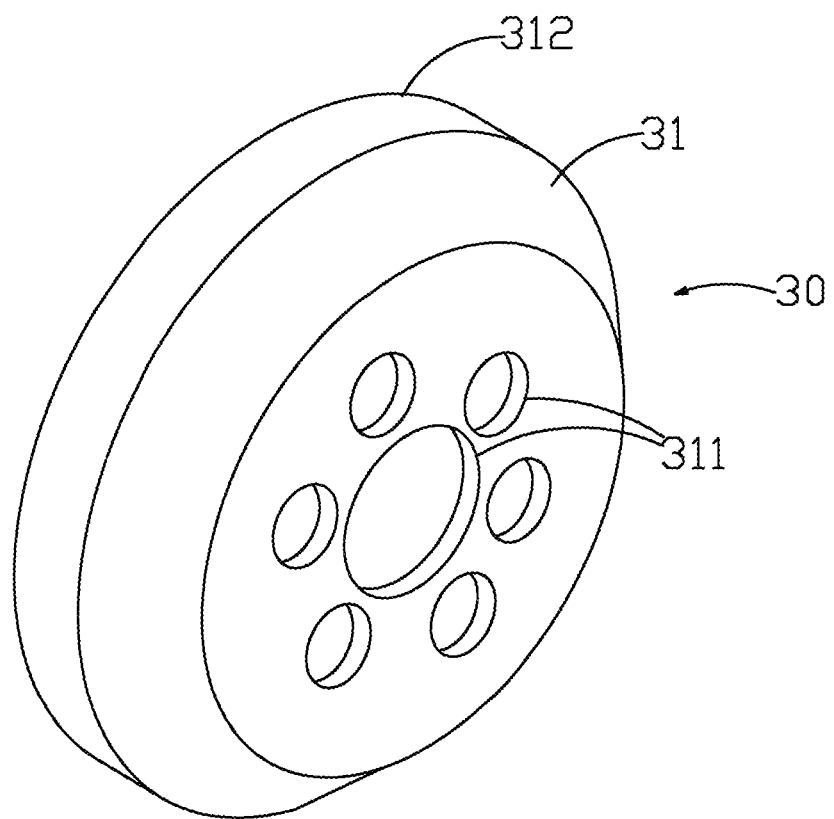
FIG. 6 shows a structural schematic diagram of the disk structure according to the present invention.

Please refer to FIG. 2 and FIG. 6. Take a first and a second AHSS material 10, 30. The first AHSS material 10 is a steel sheet with tensile strength equal to or above 590 MPa; the second AHSS material 30 is a steel sheet with tensile strength equal to or above 980 MPa. The types of the AHSS materials can be hot rolled steel sheets (SAPH), dual phase (DP) steels, complex phase (CP) steels, transformation-induced plasticity (TRIP) steels, or Martensitic (MS) steels.

Step S12: Roll to Circular Ring of the Rim.

Please also refer to FIG. 2. First, use an automatic three-axis double-side-displacement rolling machine (not shown in the figure) to perform rolling operation and form a rim 12. The rim 12 has a junction 121 (formed by opposing ends).

Step S13: Weld the Opposing Ends of the Rim.

Figure 3:
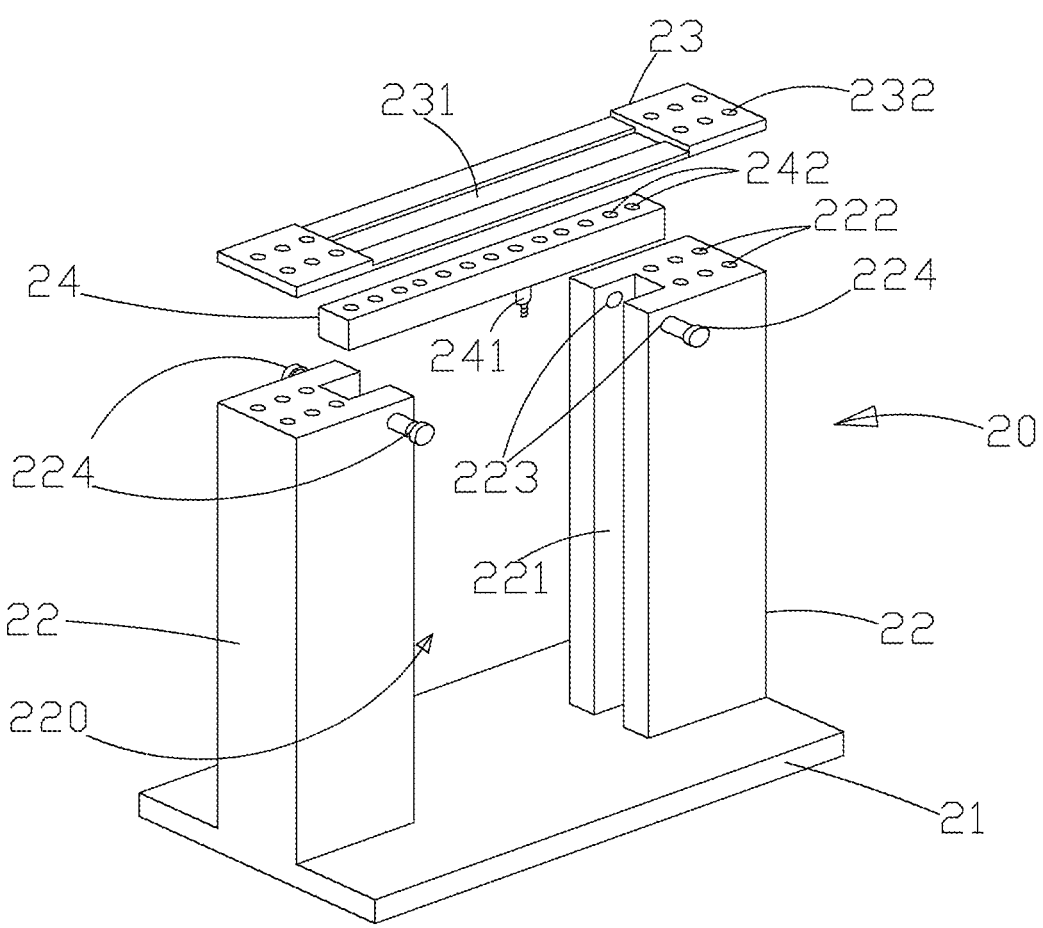
FIG. 3 shows an exploded view of the welding jig according to the present invention.
Figure 4A:
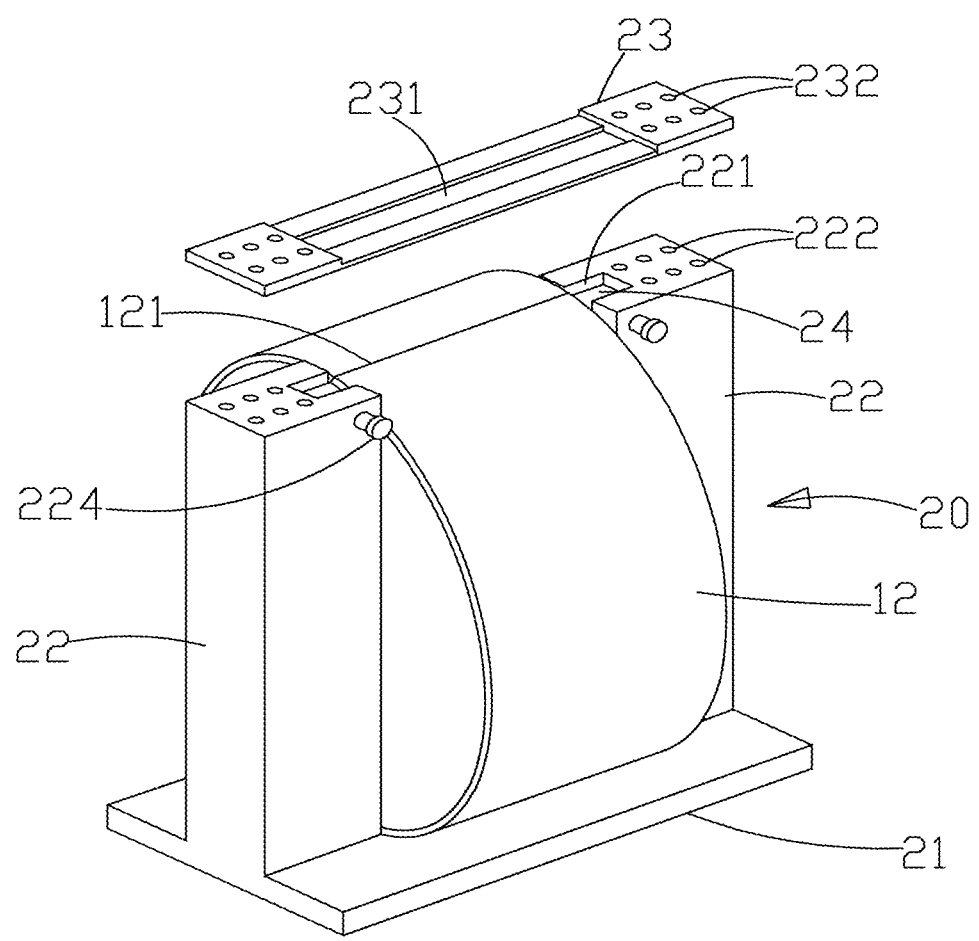
FIG. 4A shows an exploded view of the welding jig according to the present invention.
Figure 4B:
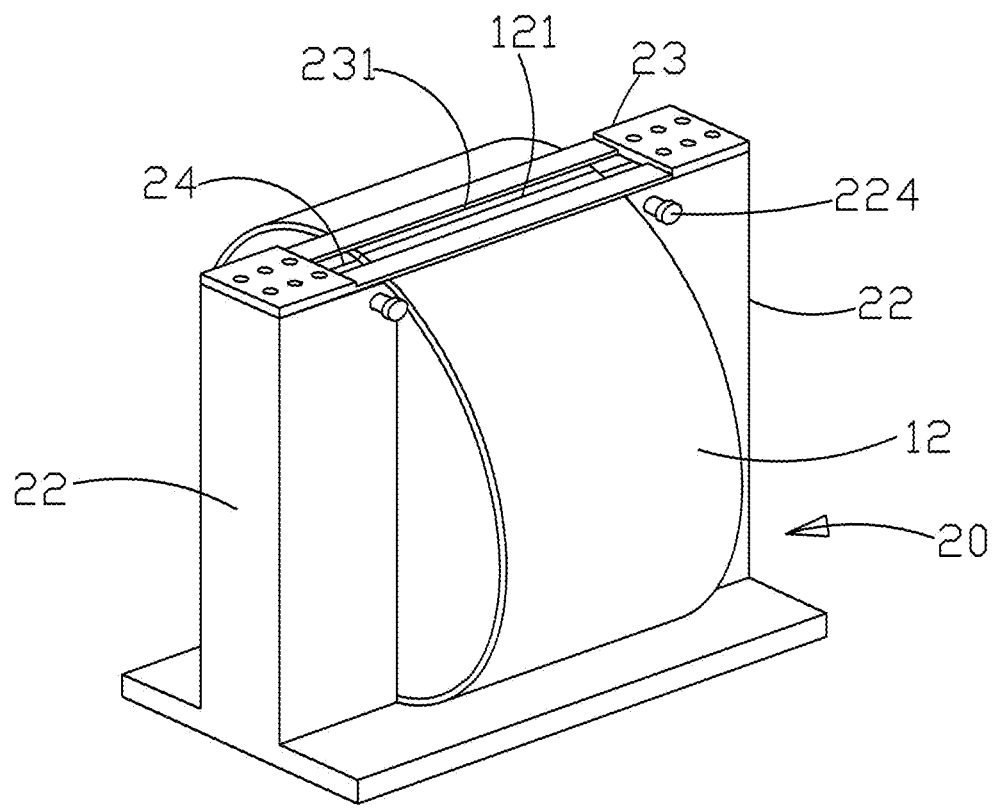
FIG. 4B shows an exploded view of the welding jig according to the present invention.

Please refer to FIGS. 3, 4A, and 4B. Place the rim 12 on a welding jig 20 for performing low heat input welding process. The welding jig 20 is a jig designed for facilitating welding the rim 12. The welding jig 20 comprises a base 21 with a pair of positioning posts 22 on both sides. Opposing grooves 221 are disposed on the facing sides of the two positioning posts 22. An accommodating space 220 is formed between the two positioning posts 22. A plurality of positioning holes 222 are disposed on the top surface of the positioning posts 22. Locking holes 223 communicating with the grooves 221 are disposed on both sides of the top of the positioning posts 22. Besides, the welding jig 20 further comprises a top positioning member 23 and a bottom positioning member 24. The top positioning member 23 can be a plate used as a plate-pressing jig and designed for preventing deformation induced by thermal expansion and contraction. The top positioning member 23 has an operating opening 231 at the center part and a plurality of positioning holes 232 on both sides. The plurality of positioning holes 232, 222 can be locked to each other by screw members (not shown in the figures) so that the top positioning member 23 is fixed on the top surface of the positioning posts 22. The bottom positioning member 24 is embedded in the grooves 221. By passing screw members 224 through the locking holes 223, the bottom positioning member 24 is fixed in the grooves 221. The bottom member 24 has a plurality of air holes 242 on the top surface and a nozzle 241 projecting its bottom surface. The air holes 242 communicate with the nozzle 241 via the channels inside the bottom positioning member 24. The nozzle 241 is used for connecting to an air pipe (not shown in the figures), and thus leading external air to spurt from the nozzle 241 and providing back blowing during the welding process for avoiding oxidation. While performing low heat input welding operation, the rim 12 is placed in the accommodating space 220 of the welding jig 20. In addition, the top and bottom portions of the rim 12 are clipped and positioned by the top and bottom positioning members 23, 24 (as shown in FIG. 4B). Thereby, linear welding can be performed at the junction 121 of the rim 12 through the operating opening 231 and forming a hollow cylindrical rim 12.

The top and bottom positioning members 23, 24 of the welding jig 20 provide proper protection, press and hold, and facilitate loading and unloading material during the welding process of the rim 12. They can improve the welding quality, shorten the manufacturing time, and provide the function of heat dissipation during welding. Moreover, the materials of the top and bottom positioning members 23, 24 of the welding jig 20 can be selected from copper, aluminum, or steel.

According to an embodiment, the rolled rim 12 is first fixed by spot welding and a guiding plate is welded (not shown in the figure). Then, it is installed and fixed to the welding jig 20 for facilitating the welding operation. According to the present embodiment, CMT is selected for the welding operation, which is done by one weld and the permeance is complete. Besides, GTAW/TIG can be selected to weld the opposing ends of the rim in the step S13. Nonetheless, two welds, namely, top and bottom welds, are required and no stuffing is needed.

Step S14: Grind Welds and Burnish.

Step S15: Expanding the Rim.

After linearly welding the rim 12 using the low heat input welding process is completed, the welded part should be ground to smooth the surface. In mass production, a scraper can be designed to remove welding crowns or welding roots. Next, the hole expanding operation is performed to the hollow cylindrical rim 12 by a hydraulic press machine (not shown in the figures). Normally, the hole expanding operation is performed twice.

Step S16: Perform Spinning/Roll Forming for the Rim.

Figure 5:
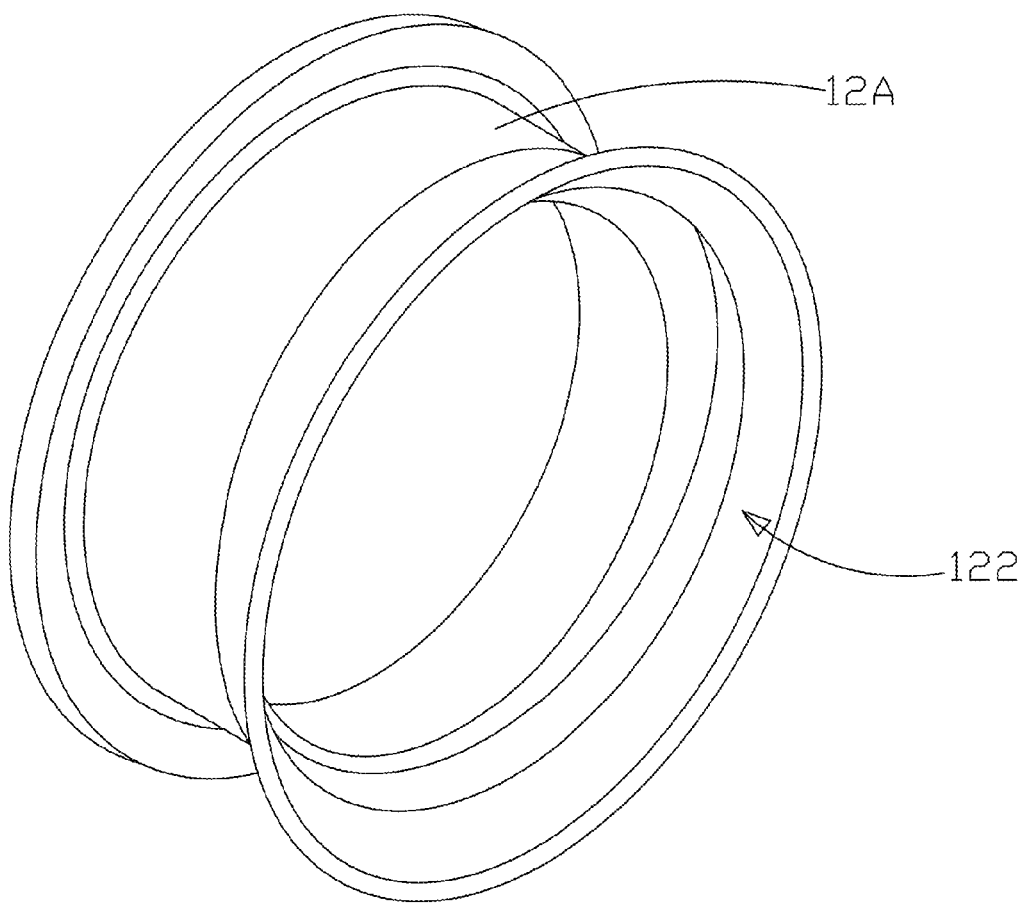
FIG. 5 shows a structural schematic diagram of the rim structure after hole expanding according to the present invention.

After the hole expanding operation, it is required to make sure there is no break at the welding part. Then, perform the spinning/roll forming operation by a spinning/roll forming machine (not shown in the figure), for example, spinning/ roll forming for four times, for producing a hole expanded rim 12A, as shown in FIG. 5. The rim 12A has a junction part 122.

Step S21: Press the Disk.

Please refer to FIG. 6. In the manufacturing process, the AHSS material 30 is pressed to form the disk 31 by pressing equipment (not shown in the figure) simultaneously. The disk 31 has a plurality of disk holes 311 on one surface; an annular junction surface 312 is formed on the other surface. In addition, the AHSS rim 12 (12A) and the disk 31 can be combinations of the same or different types of AHSS. The types of the AHSS, as described above, include SAPH, DP, CP, TRIP, or MS steels.

The thickness of the rim 12A ranges from 1.2 mm to 2.2 mm; the thickness of the disk 31 ranges from 1.6 mm to 2.2 mm.

Step S17: Assemble the Rim and the Disk.

Figure 7:
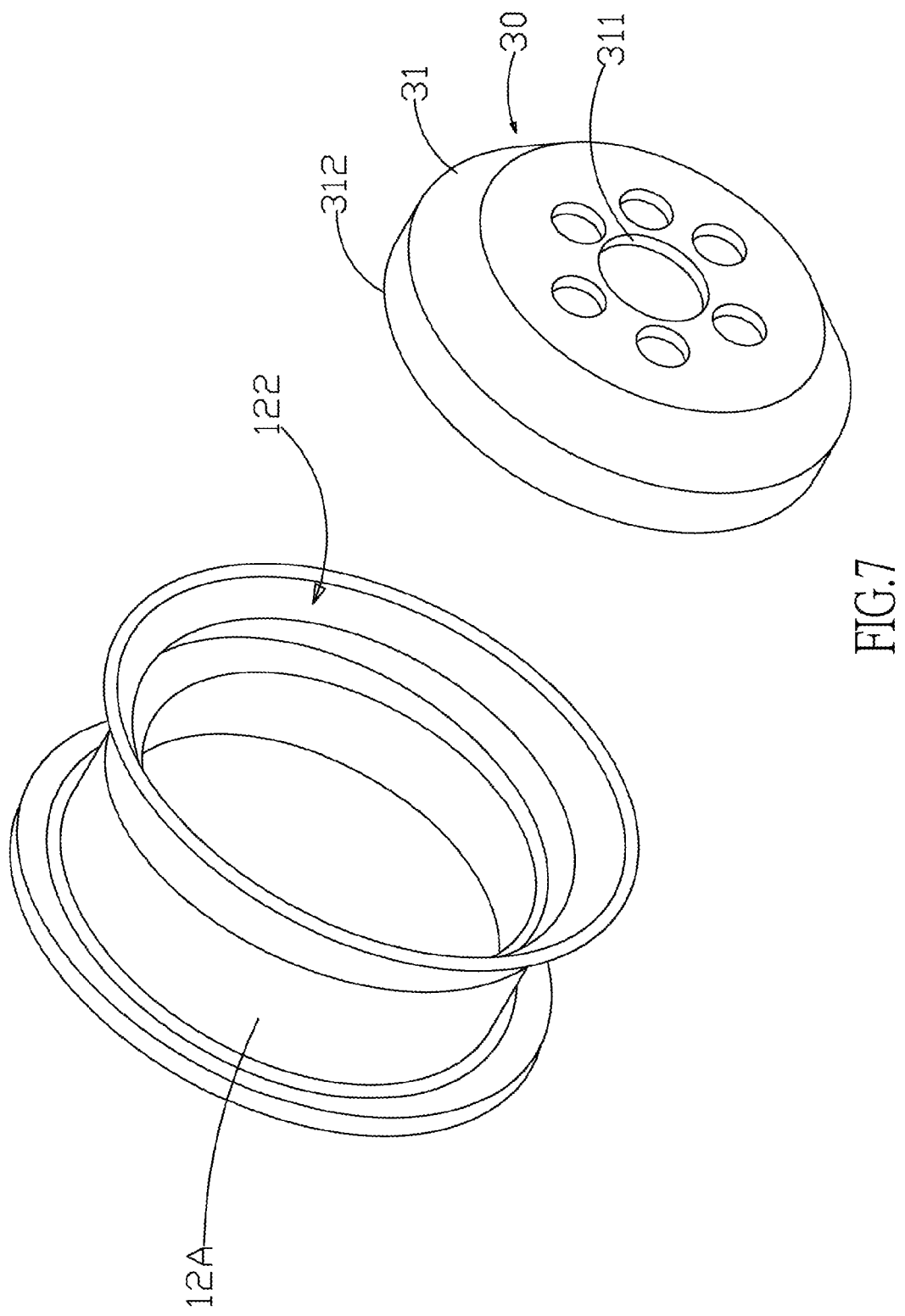
FIG. 7 shows an exploded view of the steel wheel according to the present invention.

Please refer to FIG. 7. The formed rim 12A and disk 31 are fixed mechanically by a hydraulic press machine (not shown in the figure). In other words, the junction part 122 of the rim 12A and the annular junction surface 312 of the disk 31 are joined and fixed.

Step S18: Weld the Rim and the Disk.

Figure 8:
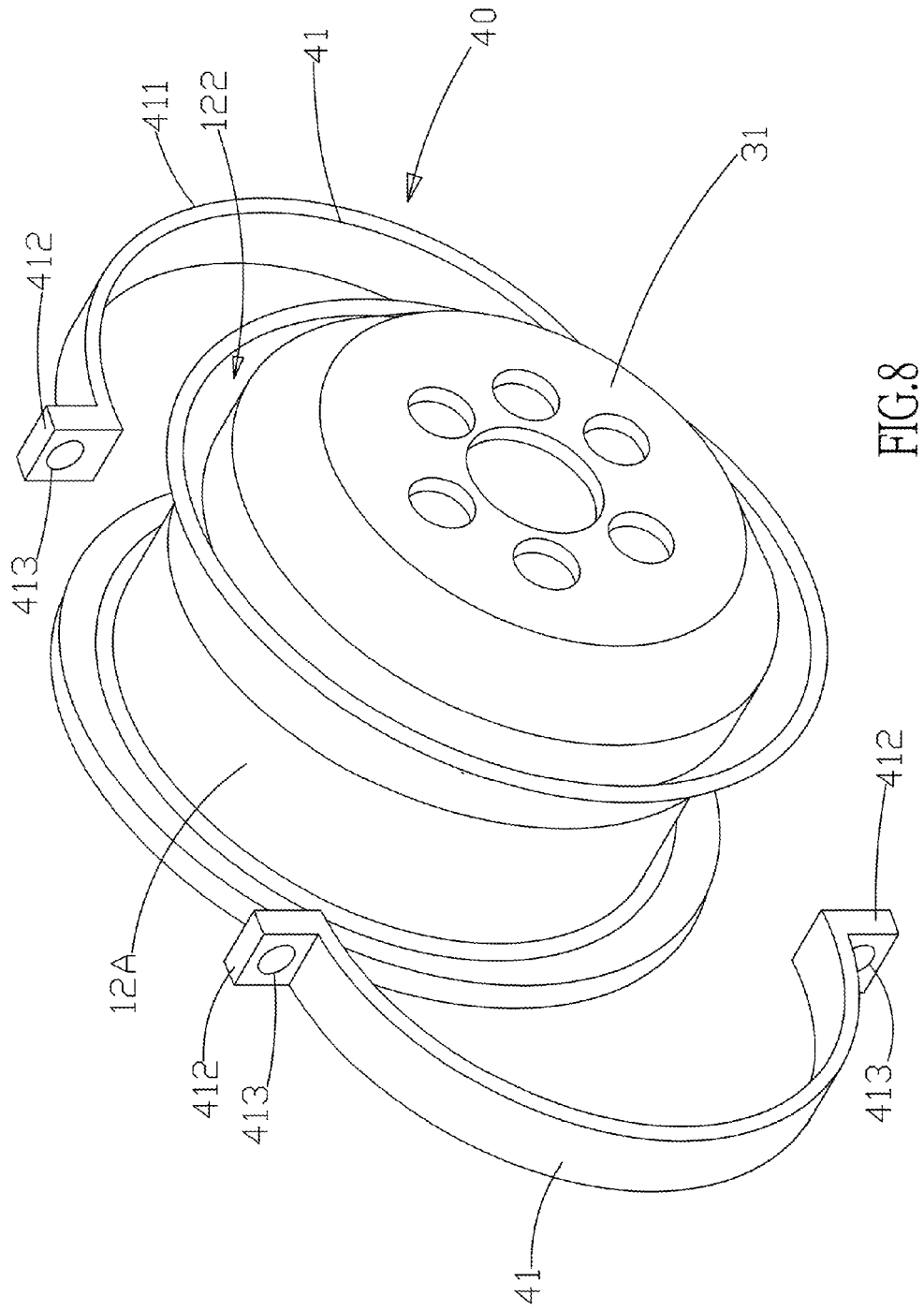
FIG. 8 shows a first schematic diagram of operation before welding the steel wheel according to the present invention.
Figure 9:
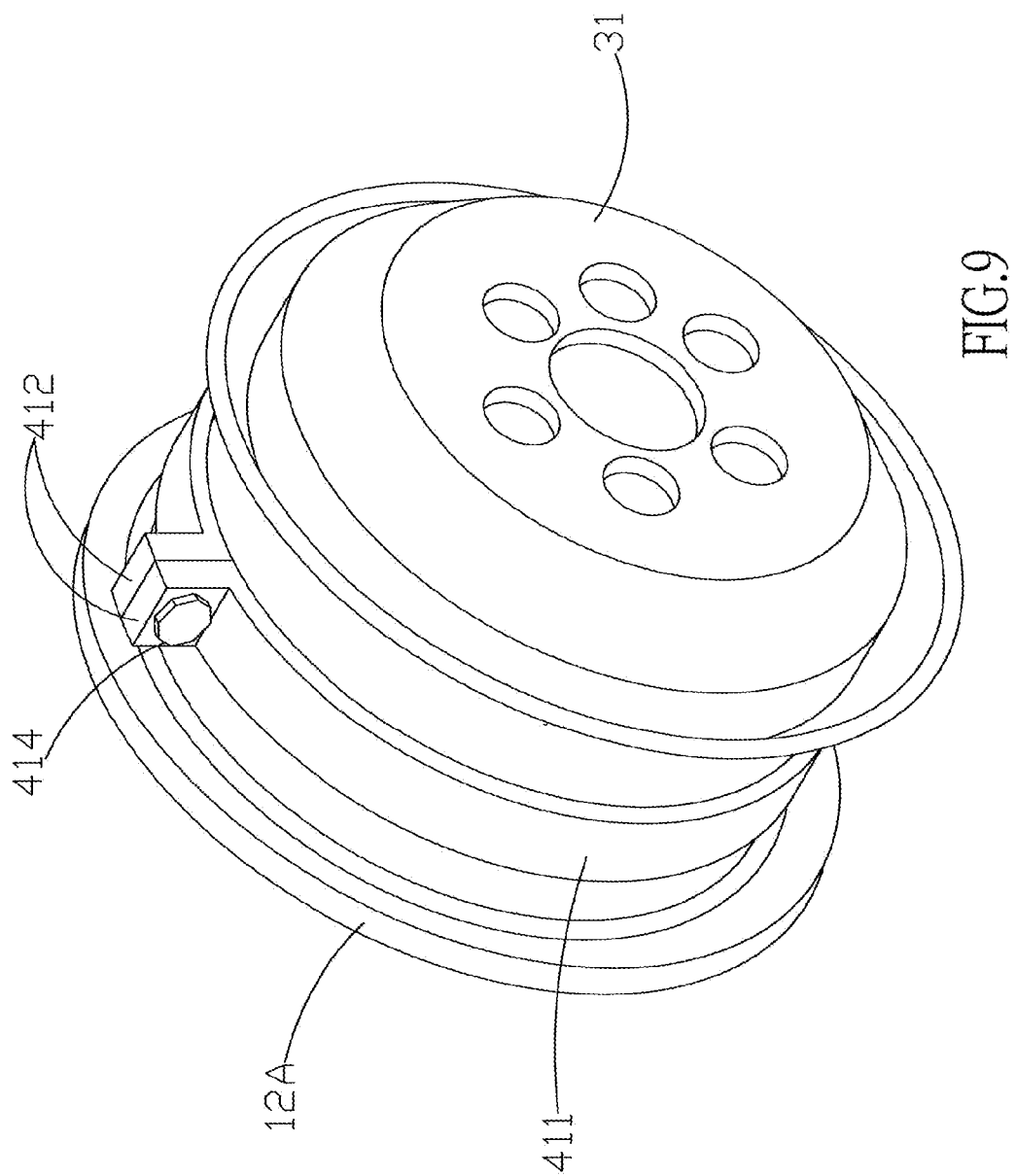
FIG. 9 shows a second schematic diagram of operation before welding the steel wheel according to the present invention.

Namely, by using a hoop welding jig 40, as shown in FIGS. 7 and 8, low heat input welding, such as the CMT welding, is performed on the fixed rim 12A and the disk 31 to manufacture a steel wheel. The hoop welding jig 40 comprises two curved hoop members 41. Each of the curved hoop members 41 has a curved part 411 and fixing parts 412 at both ends of the curved part 411. The fixing part 412 has a fixing hole 413. As the annular junction surface 312 of the disk 31 is connected to the junction part 122 of the rim 12A, as shown in FIG. 8, the hoop welding jig 40 (the two curved hoop members 41) fixes the circumference. Then the connected fixing holes 413 are screwed and joined by a screw member 414. Hence, the disk 31 and the rim 12 are hooped together tightly, ash shown in FIG. 9, for facilitating the operation of low heat input welding. The hoop welding jig 40 provide the heat dissipation function during the welding process for the steel wheel. On one hand, it reduces the input heat and thus enhancing the strength and tenacity of the steel wheel. On the other hand, it also makes the appearance of the steel wheel better. Furthermore, the material of the hoop welding jig 40 can be selected from copper, aluminum, or steel; the low heat input welding is the CMT welding or the GTAW/TIG welding.

Step S19: Finish the High-Strength Steel Wheel.

In other words, by using low heat input welding technology, the AHSS is used for manufacturing the steel wheel. The welding operation can be combined with robotic arms or rotary system for performing synchronous and automatic welding operations. Finally, radial fatigue tests are performed with requirements more stringent than commercial regulations.

The application of the manufacturing method for AHSS wheel according to the present invention can upgrade the steel wheels of lower-grade steel used in current ATVs or cars to upper grades. Presently, including rims and disks, the steel material of 12-inch steel wheels in ATVs is 440 Mpa steel. For 15-inch steel wheels for cars, the rims adopt 440 Mpa steel grade and the disks adopt 590 MPa steel grade. According to the present invention, the rims are upgraded to or above 590 Mpa steel grade; the disks are upgraded to or above 980 Mpa steel grade. Compared to the traditional commercial steel wheels, the weight of the developed AHSS steel wheels is reduced by more than 30%, thanks to apparent thinning effect in AHSS. For example, in a traditional 12-inch steel wheel of ATV, the thicknesses of the rim and the disk are 2.0 mm$^t$ and 2.6 mm$^t$, respectively. As for the newly developed AHHS wheel, the thicknesses of the rim and the disk are only 1.4 mm$^t$ and 2.0 mm$^t$, respectively. In addition, the weight of a traditional 12-inch 440 Mpa grade wheel for ATV is 4.45 Kg, while the weight for a newly developed AHSS wheel is only 3.044 Kg, which is close to the weight, 2.994 Kg, of a 12-inch aluminum-alloy welded wheel for ATV. In addition to higher safety and strength, the steel wheel according to the present invention also has excellent fatigue lifetime. For example, by loading a 12-inch ATV steel wheel with 500 Kg, the fatigue lifetime reaches 1,000,000. The load is exceeds the requirement by the regulations of SAE J328 and CNS9479 and the loading requirement in the industry by more than 32%; and the fatigue lifetime is more than twice the required value. By extending the technology according to the present invention to the development of 15-inch AHSS wheels, the testing results also show high-strength, tolerant, and lightweight performance. Thereby, the present invention can be applied up to wheels of ATVs, UVs, and cars with sizes over 15 inches as well as down to their wheels with sizes under 10 inches.

Accordingly, by using the method described above, the present invention can apply low heat input welding technology and the provided jig to AHSS, the wheels of ATV four-wheeled motorcycles, UVs, and car wheels (steel wheels). According to the present invention, the welding quality of products can be improved significantly; the fatigue lifetime of wheels can be enhanced; and wheels are lightweight. Thereby, the problem of welding AHSS using traditional high heat input welding technology can be solved and the traditional materials for wheels can be thus replaced.

Furthermore, the technical combination according to the present invention can be applied to the production of AHHS wheels with tensile strength reaching or above 590 MPa and 980 MPa. The manufacturing method for wheel comprises rolling, welding, hole expanding, spinning/roll forming, and pressing for producing lightweight, high-strength, superior fatigue lifetime, excellent welding and formation, and high quality wheels.

In addition, the thickness of rims and disks according to the present invention can be reduced for achieving lightweight (lighter by over 30% than 440 MPa steel grade), high-strength, and anti-fatigue purposes. The radial load is identical to or greater than that of a commercial wheel (steel wheel). The fatigue lifetime is twice the lifetime of a commercial wheel (steel wheel). For example, for a 12-inch ATV wheel, the radial load is 500 Kg (compared to 377 Kg of commercial requirement); the fatigue lifetime is 1,000,000 times (compared to 500,000 of commercial requirement). The present invention outperforms the regulations of SAE J328 and CNS9479. As applied to 15-inch steel wheels, the present invention has similar performance.

Moreover, the provided jig according to the present invention is designed to work with the low heat input welding process. By combining robots and rotary system for performing synchronous welding, the production process can be automated, improving the production efficiency significantly. Compared with the traditional MAG welding, the steel wheels manufactured according to the present invention have the property of low deformation. By setting appropriate welding parameters, the effect of no spatter and high quality welding can be achieved. In addition, labor costs for subsequent processes can be saved substantially.

Besides, the present invention adopts low heat input welding, whose heat input is lower than traditional MAG welding by approximately 30%. The welds and heat-affected zones are narrower; the welded parts have higher welding strength, elongation rate, and bend tenacity. Thus, the present invention is suitable for welding AHSS, thin sheets, and steel wheels. Besides, the problem of low yield rate due to cracks while forming rims after flash welding higher strength steel grades (above 590 MPa) can be solved, making it applicable to welding rims and disks of wheels.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A manufacturing method for advanced high-strength steel wheel, comprising steps of:
    taking an advanced high-strength steel (AHSS) with at least 590 MPa of tensile strength for rolling to circular ring of a rim;
    applying low heat input welding at the junction of said rim to form a hollow cylindrical rim, wherein said rim is placed in a welding jig for performing said low heat input welding; said welding jig comprises a base having a pair of positioning posts on both sides, the inner sides of said two positioning posts have grooves opposing to each other, a top positioning member having an operating opening is fixed on the top surface of said positioning posts, a bottom positioning member is located corresponding to and below said top positioning member and embedded in said grooves, said bottom positioning member has a plurality of air holes on the top surface and a projective nozzle communicate with said plurality of air holes, and said rim is positioned between said top positioning member and said bottom positioning member;
    performing hole expanding and spinning/roll forming operations to said rim;
    taking another advanced high-strength steel with at least 980 MPa of tensile strength for pressing and forming a disk; and
    applying low heat input welding to said rim and said disk to produce a wheel.

2. The manufacturing method for advanced high-strength steel wheel of claim 1, wherein a process for forming said rim is performed by rolling advanced high-strength steel using an automatic three-axis double-side-displacement rolling machine, and the operation of forming said disk is performed by pressing advanced high-strength steel using pressing equipment.

3. The manufacturing method for advanced high-strength steel wheel of claim 1, wherein the materials of said welding jig, said top positioning member, and said bottom member are selected from copper, aluminum, or steel.

4. The manufacturing method for advanced high-strength steel wheel of claim 1, wherein said rolled rim is first fixed by spot welding.

5. The manufacturing method for advanced high-strength steel wheel of claim 1, wherein after said low heat input welding of said rim is completed, the welded part of said rim is ground for removing welding crowns or welding roots; said hole expanding operation for said hollow cylindrical rim is perform by a hydraulic press machine; and said spinning/roll forming operation is performed by a spinning/roll forming machine.

6. The manufacturing method for advanced high-strength steel wheel of claim 1, wherein the thickness of said rim ranges from 1.2 millimeters to 2.2 millimeters; the thickness of said disk ranges from 1.6 millimeters to 2.2 millimeters.

7. The manufacturing method for advanced high-strength steel wheel of claim 1, wherein said low heat input welding is the cold metal transfer (CMT) welding or the gas tungsten arc welding/tungsten inert gas arc welding (GTAW/TIG).

8. The manufacturing method for advanced high-strength steel wheel of claim 1, wherein the types of said advanced high-strength steels include hot rolled steel sheets (SAPH), dual phase (DP) steels, complex phase (CP) steels, transformation-induced plasticity (TRIP) steels, or Martensitic (MS) steels.

9. The manufacturing method for advanced high-strength steel wheel of claim 8, wherein said advanced high-strength steel of said rim and said advanced high-strength steel of said disk can be combinations of the same or different types of advanced high-strength steels.

10. The manufacturing method for advanced high-strength steel wheel of claim 1, wherein before performing said low heat input welding on said rim and said disk, a hydraulic press machine is used for fixing mechanically said rim and said disk; and said low heat input welding on said rim and said disk is performed using a hoop welding jig.

11. The manufacturing method for advanced high-strength steel wheel of claim 10, wherein said hoop welding jig comprises two curved hoop members; each of said curved hoop member has a curved part and fixing parts at both ends of said curved part; each fixing part has a fixing hole; and said each fixing hole is screwed and joined to each other by a screw member.

12. The manufacturing method for advanced high-strength steel wheel of claim 10, wherein the material of said hoop welding jig is selected from copper, aluminum, or steel.

* * * * *